May 21, 1935.  D. A. BELDEN  2,002,466

KNOB OR HANDLE CONSTRUCTION

Filed May 1, 1934

INVENTOR
Don A. Belden
BY Ely & Barrow
ATTORNEYS

Patented May 21, 1935

2,002,466

UNITED STATES PATENT OFFICE 2,002,466

KNOB OR HANDLE CONSTRUCTION

Don A. Belden, Akron, Ohio, assignor to The Baker-McMillen Company, Akron, Ohio, a corporation of Ohio Application May 1, 1934, Serial No. 723,350

6 Claims. (Cl. 16—121)

This invention relates to knob or handle constructions for attachment to sheet metal or similar constructions such as employed in vessels or utensils such as kitchen or enamel ware.

The general purpose of the invention is to provide a wooden or composition knob or handle construction which will be inexpensive to manufacture and will yet be as effective from the standpoint of appearance as the more expensive molded knobs or handles in that the attaching means for the knob or handle will not be visible from the exterior of the vessel. It is a further purpose to design a new and improved method of securing a knob in position which will be strong and permanent in character, being superior to the usual screw attachment in general use heretofore. The invention is applicable to knobs or handles for ordinary cooking utensils or the lids thereof and also to coffee pots, percolators, and wherever a handle of the general type shown and described may be employed.

The foregoing purposes of the invention are attained in the knob and handle constructions illustrated in the accompanying drawing and described below.

Of the accompanying drawing.

Figure 1:
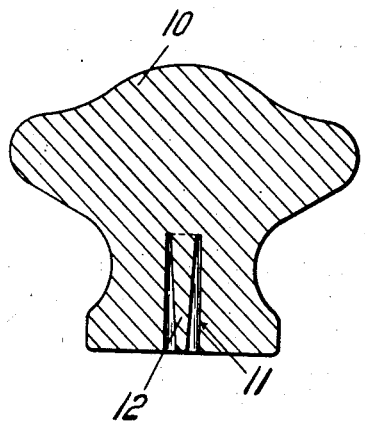
Figure 1 is a vertical section of a knob construction embodying the invention, showing the way in which the knob is made prior to attachment.

Referring to the drawing, the numeral 10 designates a wooden or composition knob, in the bottom of which is formed a bore or recess 11 preferably of uniform diameter. This bore or socket is so formed as to leave an integral cone 12 extending from the inner end of the bore substantially to the open end thereof.

Figure 2:
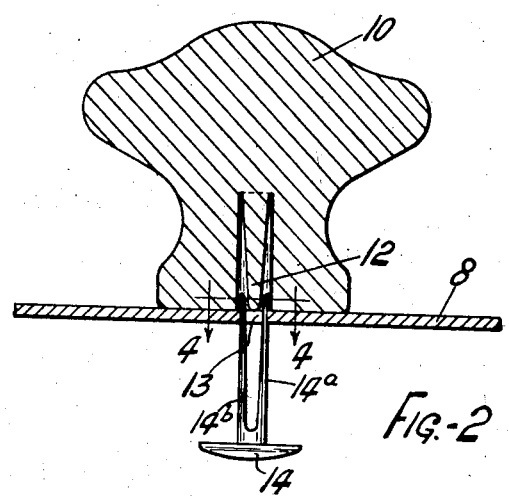
Figure 2 is a similar view of the knob shown as it is applied.

As shown in Figure 2, the surface to which the knob is to be attached is illustrated as utensil or lid 8 having an aperture formed thereon as at 13, on the outer side of which is placed the knob 10 so that the bore will register with the knob. A rivet 14 is provided for attaching the knob to the utensil. This is preferably of the bifurcated type as shown but may be of the sleeve type. In the form shown the rivet is provided with the two upstanding prongs 14ª and 14ᵇ.

The rivet 14 is somewhat longer than the depth of the bore and is driven into the bore from the inside of the vessel (the rivet is shown entering the bore in Figure 2), and, when it is driven home, the ends of the bifurcations embed in the wood and bend outwardly to assist in securing the knob tightly on the vessel.

The cone 12 as is apparent is larger adjacent its base than the internal diameter of the rivet or the space between the bifurcations thereof. In driving the rivet home, this cone becomes compressed and fills or substantially fills the space in the rivet to provide a binding action assisting in preventing loosening of the knob, and also to spread the arms of the rivet outwardly and thus bind the rivet securely in place. As the points of the rivet are longer than the base, the final operation is to drive the points firmly into the body of the knob.

By forming the knob in the manner described, the driving-in of the rivet will not split the wooden knob for the reason that while the body of the rivet snugly engages the body of the wood, the greatest pressure is exerted upon the rivet by the projection 12. The simplicity of the construction and its effectiveness as a means for securing the knob in position give the advantageous results.

It will be understood that changes and modifications may be made in specific embodiments of the invention within the scope of the claims.

Figure 5:
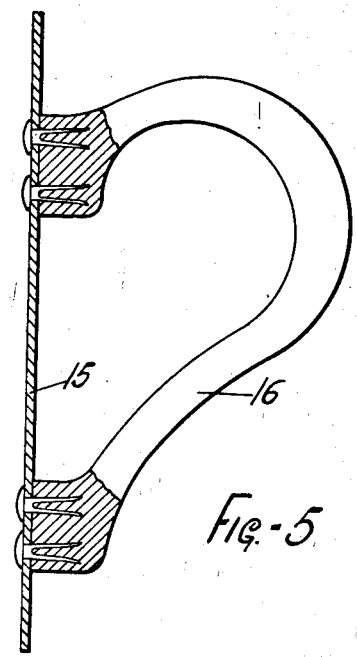
Figure 5 illustrates a handle applied to a vessel in accordance with the invention.
Figure 3:
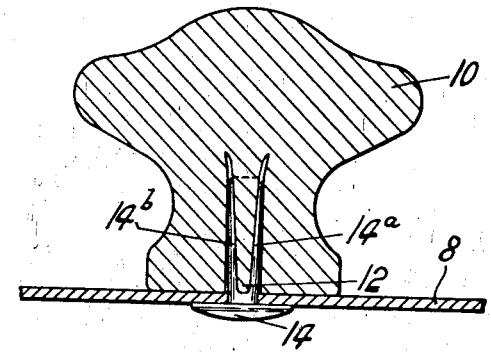
Figure 3 is a similar view showing the knob secured in position.
Figure 4:
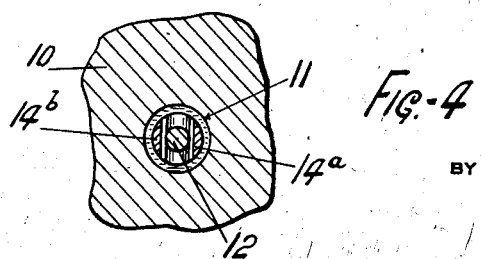
Figure 4 is an enlarged section on line 4—4 of Figure 3.

In Figure 5 the invention is shown as applied to a handle 16 of a coffee pot 15, the rivets and associated parts being shown in duplicate.

The invention may be applied to any form of knob or handle permanently attached to a receptacle, cover or the like, and the terms "knob" or "handle" as used in the claims are intended to be generic to all such devices.

What is claimed is:

1. An attachment for a sheet metal or similar construction comprising a knob having a preformed recess, a projection integral with the knob and located in the recess, a headed rivet having a shank portion which is split to provide prongs, the projection being compressed between the prongs of the rivet when the same is forced into position.

2. An attachment for a sheet metal or similar construction comprising a knob having a preformed recess, a projection integral with the knob and located in the recess, a headed rivet having a shank portion which is split to provide prongs, the projection being compressed between the prongs of the rivet when the same is forced into position, the prongs being greater in depth than the depth of the recess.

3. In combination with a knob or handle having a recess extending from its contacting surface, a cone-shaped projection extending into the recess, and a rivet with a head and shank, the shank being bifurcated to a point closely adjacent the head, the maximum diameter of the projection being greater than the maximum distance between the prongs of the rivet so as to cause the projection to be compressed when the rivet is in final position.

4. In combination with a knob or handle having a preformed recess extending inwardly from the base, an integral tapering projection located in the recess, and a rivet having a similarly shaped recess in the shank portion adapted to fit over the projection, the projection being of sufficient volume to be compressed by the rivet as the latter is driven in position, the shank extending into the knob beyond the base of the recess.

5. In combination with a knob or handle having a preformed recess extending inwardly from the base, an integral tapering projection located in the recess and of substantially the same length as the depth of the recess, and a rivet having a similarly shaped recess in the shank portion adapted to fit over the projection, the projection being of sufficient volume to be compressed by the rivet as the latter is driven in position, the shank extending into the knob beyond the base of the recess.

6. An attachment for sheet metal ware comprising a knob having a preformed recess extending from the base thereof, an integral projection extending from the innermost point of the recess substantially to the base of the knob, and a securing element having a central recess to fit over the projection and be compressed thereby and extending into the body of the knob.

DON A. BELDEN.